US010129743B2

(12) United States Patent
Bortnem et al.

(10) Patent No.: US 10,129,743 B2
(45) Date of Patent: Nov. 13, 2018

(54) METHOD AND APPARATUS FOR ESTABLISHING A SECURE COMMUNICATION LINK BETWEEN A MOBILE ENDPOINT DEVICE AND A NETWORKED DEVICE

(71) Applicant: Xerox Corporation, Norwalk, CT (US)

(72) Inventors: Mark A. Bortnem, Newberg, OR (US); Robert C. Carroll, Newberg, OR (US); Jeffrey A. Bray, Sherwood, OR (US)

(73) Assignee: Xerox Corporation, Norwalk, CT (US)

( * ) Notice: Subject to any disclaimer, the term of this patent is extended or adjusted under 35 U.S.C. 154(b) by 414 days.

(21) Appl. No.: 13/799,669

(22) Filed: Mar. 13, 2013

(65) Prior Publication Data
US 2014/0281522 A1 Sep. 18, 2014

(51) Int. Cl.
*H04W 12/06* (2009.01)
*H04W 12/02* (2009.01)

(52) U.S. Cl.
CPC ............ *H04W 12/06* (2013.01); *H04W 12/02* (2013.01)

(58) Field of Classification Search
CPC . H04L 63/0272; H04L 63/20; H04L 63/0283; H04L 63/06; H04L 63/067; H04L 63/0846; H04L 63/18; G06F 21/608; G06F 21/84
See application file for complete search history.

(56) References Cited

U.S. PATENT DOCUMENTS

| | | | | |
|---|---|---|---|---|
| 8,251,290 B1* | 8/2012 | Bushman et al. | ....... | 235/462.01 |
| 8,823,494 B1* | 9/2014 | Kovitz et al. | ................ | 340/10.1 |
| 8,842,310 B2* | 9/2014 | Tredoux et al. | ............. | 358/1.14 |
| 9,887,992 B1* | 2/2018 | Venkat | ................ | H04L 63/0853 |
| 2006/0168128 A1* | 7/2006 | Sistla | ...................... | H04W 4/24 709/219 |
| 2007/0058074 A1* | 3/2007 | Yamagishi | ............. | H04N 5/232 348/372 |
| 2009/0313705 A1* | 12/2009 | Adams et al. | .................. | 726/30 |
| 2011/0184822 A1* | 7/2011 | Matkovic | ............. | G06Q 20/202 705/18 |
| 2012/0203605 A1* | 8/2012 | Morgan | ............. | G06Q 20/3276 705/14.17 |
| 2012/0252405 A1 | 10/2012 | Lortz et al. | | |

(Continued)

FOREIGN PATENT DOCUMENTS

WO    WO/2012/036115    *    3/2012    ......... H04N 1/00281

*Primary Examiner* — Yin Chen Shaw
*Assistant Examiner* — Carlos E Amorin

(57) ABSTRACT

A method, non-transitory computer readable medium, and apparatus for establishing a secure communication link between a mobile endpoint device and a networked device are disclosed. For example, the method scans an optical code, wherein the optical code contains configuration information and an encryption key, configures the mobile endpoint device in accordance with the configuration information, sends a request to the networked device to establish the secure communication link, wherein the request is encrypted using the encryption key and receives a confirmation from the networked device that the secure communication link is established between the mobile endpoint device and the networked device once the networked device has authenticated the mobile endpoint device based upon the request, wherein the confirmation is encrypted using the encryption key.

14 Claims, 4 Drawing Sheets

(56) References Cited

U.S. PATENT DOCUMENTS

| | | | |
|---|---|---|---|
| 2012/0254965 A1* | 10/2012 | Parker | 726/7 |
| 2012/0287290 A1* | 11/2012 | Jain | 348/207.1 |
| 2013/0016710 A1* | 1/2013 | Shinohara | 370/338 |
| 2013/0124740 A1* | 5/2013 | Liansky et al. | 709/228 |
| 2013/0176587 A1* | 7/2013 | Masaki | H04N 1/00281 358/1.13 |
| 2013/0250358 A1* | 9/2013 | Suzuki | 358/1.15 |
| 2013/0254519 A1* | 9/2013 | Benoit et al. | 713/1 |
| 2013/0262687 A1* | 10/2013 | Avery et al. | 709/229 |
| 2013/0262873 A1* | 10/2013 | Read et al. | 713/186 |
| 2013/0311627 A1* | 11/2013 | Fuller | H04L 41/0806 709/222 |
| 2014/0047524 A1* | 2/2014 | Auger | 726/7 |
| 2014/0056171 A1* | 2/2014 | Clegg | 370/254 |
| 2014/0098952 A1* | 4/2014 | Ikeda | 380/31 |
| 2014/0115708 A1* | 4/2014 | Terwilliger et al. | 726/26 |
| 2014/0122884 A1* | 5/2014 | Pieczul et al. | 713/171 |
| 2014/0226173 A1* | 8/2014 | Tredoux et al. | 358/1.14 |
| 2014/0298021 A1* | 10/2014 | Kwon et al. | 713/168 |

* cited by examiner

METHOD AND APPARATUS FOR ESTABLISHING A SECURE COMMUNICATION LINK BETWEEN A MOBILE ENDPOINT DEVICE AND A NETWORKED DEVICE

The present disclosure relates generally to establishing a communication link and, more particularly, to a method and an apparatus for establishing a secure link between an endpoint device and a networked device using an optical transmission.

BACKGROUND

Previously, when a user attempted to establish a communication link between his or her mobile endpoint device and a second device, the user would be required to manually input information into the mobile endpoint device, the second device or both the mobile endpoint device and the second device. Many times, a user may not know what information is required or where to find the information needed to input the information manually.

Alternatively, the second device could send out a signal, for example a beacon signal, that could be picked up by the mobile endpoint device. However, since the beacon signal is openly broadcast to any endpoint device, using such a method could lead to snooping or a breach of security of the initial communications used to establish the communication link.

SUMMARY

According to aspects illustrated herein, there are provided a method, a non-transitory computer readable medium, and an apparatus for establishing a secure communication link between a mobile endpoint device and a networked device. One disclosed feature of the embodiments is a method that scans an optical code, wherein the optical code contains configuration information and an encryption key, configures the mobile endpoint device in accordance with the configuration information, sends a request to the networked device to establish the secure communication link, wherein the request is encrypted using the encryption key and receives a confirmation from the networked device that the secure communication link is established between the mobile endpoint device and the networked device once the networked device has authenticated the mobile endpoint device based upon the request, wherein the confirmation is encrypted using the encryption key.

Another disclosed feature of the embodiments is a non-transitory computer-readable medium having stored thereon a plurality of instructions, the plurality of instructions including instructions which, when executed by a processor of a mobile endpoint device, cause the processor to perform a method that scans an optical code, wherein the optical code contains configuration information and an encryption key, configures the mobile endpoint device in accordance with the configuration information, sends a request to the networked device to establish the secure communication link, wherein the request is encrypted using the encryption key and receives a confirmation from the networked device that the secure communication link is established between the mobile endpoint device and the networked device once the networked device has authenticated the mobile endpoint device based upon the request, wherein the confirmation is encrypted using the encryption key.

Another disclosed feature of the embodiments is an apparatus comprising a processor that is configured to scan an optical code, wherein the optical code contains configuration information and an encryption key, configure the mobile endpoint device in accordance with the configuration information, send a request to the networked device to establish the secure communication link, wherein the request is encrypted using the encryption key and receive a confirmation from the networked device that the secure communication link is established between the mobile endpoint device and the networked device once the networked device has authenticated the mobile endpoint device based upon the request, wherein the confirmation is encrypted using the encryption key.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a method and non-transitory computer readable medium for establishing a secure communication link between a mobile endpoint device and a networked device. As discussed above, an average user of a mobile endpoint device may not know how to connect to a networked device. Some methods used to resolve this issue, such as for example, using a beacon signal, can be picked up by any endpoint device. This may lead to snooping or a breach of security of the initial communications used to establish the communication link between the mobile endpoint device and the networked device and subsequent communications between the two devices.

One embodiment of the present disclosure provides a method for establishing a secure communication link between the mobile endpoint device and the networked device. In one embodiment, even the initial communications between the networked endpoint device and the mobile endpoint device to establish the secure communication link may be secure. As a result, other endpoint devices that may be snooping may be unable to steal any information used to establish the secure communication link and to listen to the communications between the mobile endpoint device and the networked device.

Figure 1:
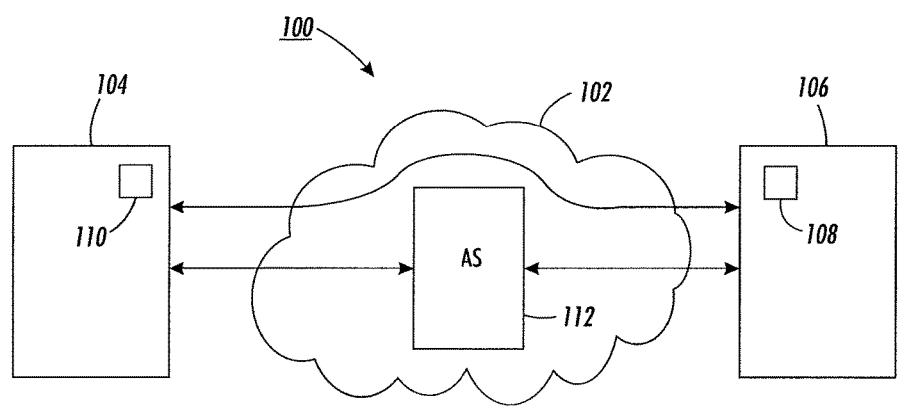
FIG. 1 illustrates one example of a communication network of the present disclosure.

To better understand the present disclosure, FIG. 1 illustrates an example of a communication network 100. In one embodiment, the communication network 100 may include a packet network such as an Internet Protocol (IP) network 102. The IP network 102 may be, for example, a cellular communication network, the Internet, a service provider network, an access network, a core network, and the like.

Figure 4:
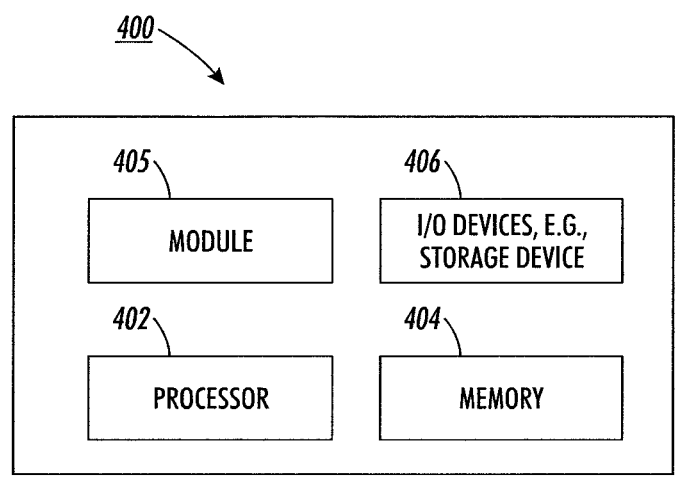
FIG. 4 illustrates a high-level block diagram of a general-purpose computer suitable for use in performing the functions described herein.

In one embodiment, the IP network 102 may include an application server (AS) 112. The AS 112 may include a processor and a memory for storing information. In one embodiment, the AS 112 may be embodied as a general purpose computer as illustrated in FIG. 4 and discussed below.

In one embodiment, the AS 112 may perform registration of a mobile endpoint device 104 and authentication of the mobile endpoint device 104 for a networked device 106. For example, the AS 112 may store a list of registered and authorized mobile endpoint devices 104 that are authorized to establish a secure communication link with the networked device 106.

It should be noted that the communication network 100 has been simplified. For example, the network 100 may include other network elements such as border elements, routers, switches, policy servers, security devices, firewalls, a content distribution network (CDN), and the like. In addition, the communication network 100 may include additional networks between the IP network 102, the mobile endpoint device 104 and the networked device 106, such as different access networks.

In one embodiment, the mobile endpoint device 104 may be in communication with the IP network 102. The mobile endpoint device 104 may have a capability to communicate over the IP network 102 (e.g., via cellular communications, via Wi-Fi communications, and the like).

In one embodiment, the mobile endpoint device 104 may be equipped with an optical reader 110. The optical reader 110 may be an image capturing device, a camera lens, an optical character reader, and the like. In one embodiment, the mobile endpoint device 104 may be any mobile endpoint device having the optical reader 110, such as for example, a laptop computer, a mobile endpoint device, a smart phone, a tablet computer, a netbook computer, and the like. In one embodiment, the mobile endpoint device may be embodied as a general computing device discussed below and illustrated in FIG. 4. It should be noted that although only a single mobile endpoint device 104 is illustrated, it should be noted that any number of mobile endpoint devices may be deployed.

In one embodiment, the networked device 106 may be any type of device capable of communicating with the IP network 102 via a wireless or wired connection. The networked device 106 may be an output device (e.g., a printer, a multi-function device, a copying machine, and the like), a kiosk, a point of sale equipment, a home automation device, and the like.

In one embodiment, the networked device 106 may display an optical code 108. The optical code 108 may be a two dimensional bar code, such as for example, a quick response (QR) code. In one embodiment, the optical code 108 may be displayed on a user interface or graphical display of the networked device 106 or printed out by the networked device 106.

In one embodiment, the optical code 108 may be a unique one time code. In other words, once the optical code 108 is used, the optical code 108 may be deactivated or invalidated (e.g., after a period of time) and the next optical code that is displayed would be different from the optical code 108 that is currently displayed. Using unique optical codes 108 (broadly dynamic optical codes) may provide more security since the optical codes are constantly changing.

In one embodiment, the optical code 108 may contain all the information that the mobile endpoint device 104 needs to request and establish a secure communication link with the networked device 106. In one embodiment, the secure communication link may be a wireless connection between the mobile endpoint device 104 and the networked device 106 over the IP network 102. The optical code 108 may contain wireless accessibility information to establish the wireless connection. The secure communication link may be over a local area network via a Wi-Fi connection, over a wide area network via cellular communications network or a broadband connection, and the like.

In one embodiment, the optical code 108 may include an encryption key, a session identification (ID), an address of the networked device 106, a communication protocol, a communication port, a wireless connection setting and the like. In other words, the mobile endpoint device 104 may automatically configure itself, find the networked device 106 and send a secure connection request using the encryption key to the networked device 106.

In one embodiment, the mobile endpoint device 104 may download and install a software application to allow the mobile endpoint device 104 to scan and interpret the optical code 108 using the optical reader 110. For example, the software application may be made available publicly by the networked device 106 (e.g., displaying yet another QR code linked to the software application), obtained via an app store, through a website, and the like.

In one embodiment, an additional layer of authentication may be provided by requiring the mobile endpoint device 104 to be registered. For example, if the networked device 106 is a kiosk used to provide Internet access in a public area, the mobile endpoint device 104 may pre-register with the kiosk provider. In another example, if the networked device 106 is a printer in a public location at a retailer, the mobile endpoint device 104 may pre-register to establish an account to control the networked device 106 to print documents via a secure communication link.

In one embodiment, the AS 112 may be used to receive identification information associated with the mobile endpoint device 104. For example, a website may be hosted by the AS 112 to receive the information with the mobile endpoint device 104. In another embodiment, the networked device 106 may perform registration of the mobile endpoint device 104 locally without the need for the AS 112. In one embodiment, the registration of the mobile endpoint device 104 may be performed by a different device other than the mobile endpoint device 104. For example, a user may use their home desktop computer to register his or her mobile endpoint device 104 via the AS 112 or the networked device 106.

Once the mobile endpoint device 104 is registered, the mobile endpoint device 104 may scan or read the optical code 108 displayed on the networked device 106 using the optical reader 110. The mobile endpoint device 104 may then configure itself to send an encrypted request, including the session ID, to establish a secure communication link. It should be noted that since the request is encrypted, no third party devices are capable of snooping the request and stealing any information from the request. In other words, the present disclosure ensures that the communication link is secure and encrypted from the first communication between the mobile endpoint device 104 and the networked device 106.

If the optical code 108 has not been previously used (e.g., checking if the session ID was previously used) and the mobile endpoint device 104 is registered, the networked device 106 may establish a secure communication link with the mobile endpoint device 104. In one embodiment, once the secure communication link is established, the optical code 108 may be invalidated, e.g., with respect to a second request for establishing a secure communication. In one embodiment, the secure communication link may be established until either a user of the mobile endpoint device 104 actively ends the secure communication link, a session timer expires or an inactivity timer expires.

Thus, one embodiment of the present disclosure provides a user with an ability to establish a secure communication link with a networked device without having any knowledge about the networked device. The user may simply scan the optical code 108 on the networked device 106 to obtain the necessary information to initiate and establish the secure communication link.

Figure 2:
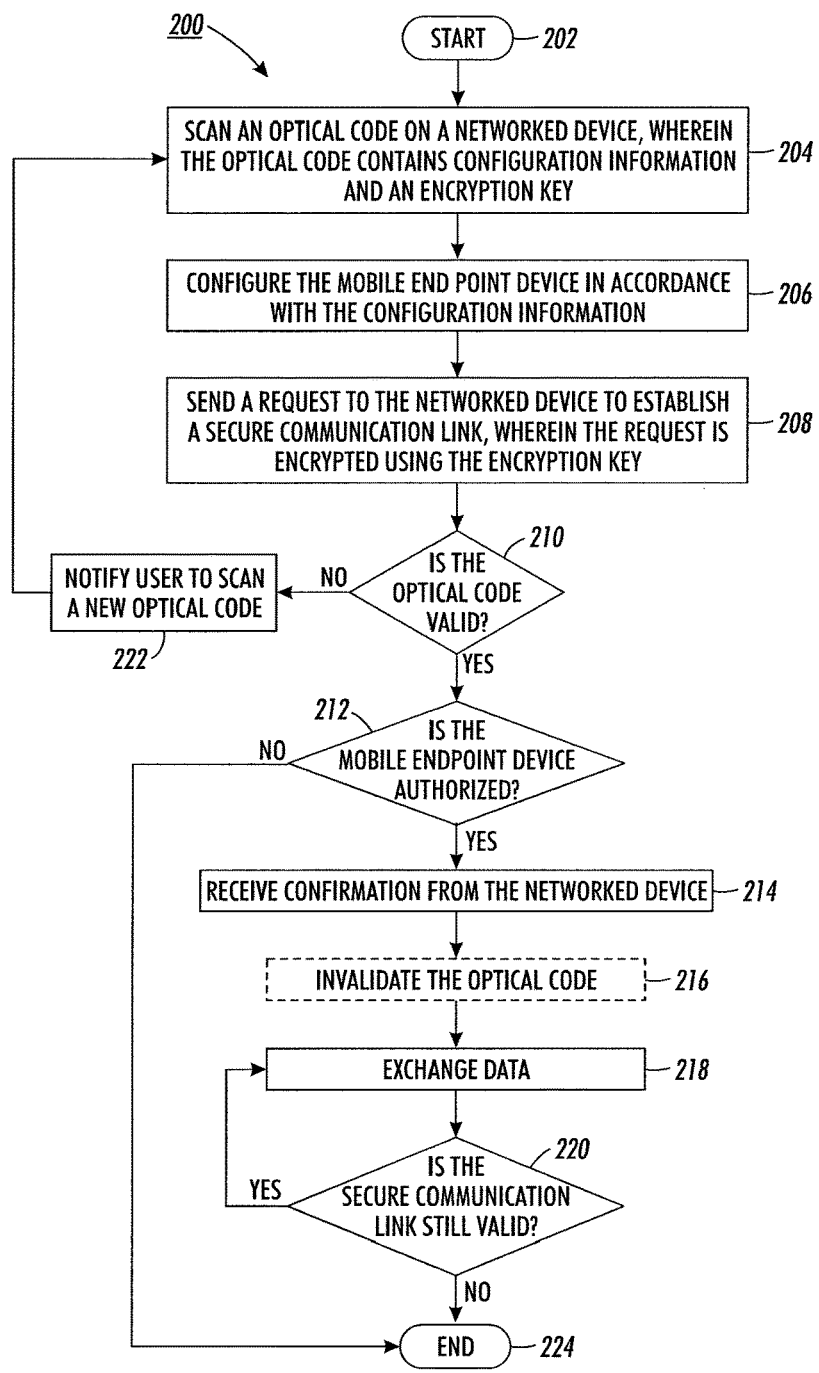
FIG. 2 illustrates an example flowchart of one embodiment of a method for establishing a secure communication link between a mobile endpoint device and a networked device.

FIG. 2 illustrates a flowchart of a method 200 for establishing a secure communication link between a mobile endpoint device and a networked device. In one embodiment, one or more steps or operations of the method 200 may be performed by the mobile endpoint device 104, the networked device 106, the application server 112 and/or a general-purpose computer as illustrated in FIG. 4 and discussed below.

The method 200 begins at step 202. At step 204, the method 200 may scan an optical code on a networked device, wherein the optical code contains configuration information and an encryption key. In one embodiment, the optical code may be displayed on a graphical display of the networked device or may be a printed out by the networked device. In one embodiment, the optical code may be a two dimensional bar code, such as for example, a quick response (QR) code, or any other bar code formats.

In one embodiment, the optical code may contain all the wireless accessibility information that the mobile endpoint device needs to request and establish a secure communication link with the networked device. For example, the optical code may include an encryption key, an address of the networked device, a communication protocol, a communication port, a wireless connection setting, and the like. For example, an optical code processing application residing in the mobile endpoint device can be loaded to process the captured optical code. Alternatively, in one alternate embodiment, the captured optical code can be forwarded to a remote location, e.g., a remote application server, which in turn will provide the decoded information, e.g., the encryption key, the address of the networked device, the communication protocol, the communication port, the wireless connection setting, and the like.

At step 206, the method 200 may configure the mobile endpoint device in accordance with the configuration information. In other words, the mobile endpoint device may select the proper communication protocol to communicate with the networked device, find the networked device using the address in the optical code, select the proper communication port or ports to establish the secure communication link between the mobile endpoint device and the networked device, and the like. Notably, in one embodiment, all the configuration parameters are contained in the optical code that was scanned by the mobile endpoint device.

At step 208, the method 200 sends a request to the networked device to establish a secure communication link, wherein the request is encrypted using the encryption key. Notably, the first communication between the mobile endpoint device and the networked device is secured by the encryption key. It should be noted that when the mobile endpoint device reads or capture the optical code, this is a one-way communication and may not necessarily be considered the first communication between the mobile endpoint device and the networked device.

As a result, third party devices cannot steal data sent between the mobile endpoint device and the networked device. In contrast, previous methods used beacon signals to send out initial connection information that could be captured or intercepted by third party devices and used to snoop on a conversation between two different endpoint devices. The present disclosure avoids this scenario by encrypting the initial communication request sent to the networked device.

At step 210, the method 200 determines if the optical code is valid. For example, the networked device may check to ensure that the session ID sent with the encrypted request has not been previously used. If the optical code is not valid, the method 200 may proceed to step 222.

At step 222, the method 200 notifies the mobile endpoint device and user to scan a new optical (broadly, the endpoint device receives a notification that the captured optical code that is being used is not valid). In other words, the optical code initially scanned may not have been unique (e.g., previously used by another user) or simply corrupted. The method 200 proceeds back to step 204 where a new optical code is generated and the mobile endpoint device scans the new optical code.

Referring back to step 210, if the method 200 determines that the optical code is valid, the method 200 may proceed to step 212. At step 212, the method 200 determines if the mobile endpoint device is authorized. For example, the networked device may check if the mobile endpoint device is registered and authorized to establish a secure communication link with the networked device. In one embodiment, identification information (e.g., a device name, media access control (MAC) ID, an IP address, and the like) associated with the mobile endpoint device may be sent with the request. The identification information may be compared identification information contained in a list of authorized mobile endpoint devices or a list of authorized users having an associated mobile endpoint device to determine if the mobile endpoint device is authorized.

In one embodiment, the determination may be made by the networked device. In another embodiment, an AS in communication with the mobile endpoint device and the networked device may perform the determination to check if the mobile endpoint device is authorized.

If the mobile endpoint device is not authorized, the method 200 may proceed to step 224 where the method 200 ends. If the mobile endpoint device is authorized, the method 200 may proceed to step 214. At step 214, the method 200 receives a confirmation from the networked device. For example, the confirmation may be a notification that the secure communication link is established between the mobile endpoint device and the networked device. The confirmation may be sent to the mobile endpoint device using the encryption key. In one embodiment, the confirmation may be a push notification sent over the secure communication link and displayed via the software application downloaded and installed on the mobile endpoint device.

At optional step 216, the method 200 may invalidate the optical code that was just used to establish the secure communication link. For example, the session ID may be marked as being used such that the same optical code is not generated. As a result, each secure communication link is unique and prevents another endpoint device from attempting to snoop on the secure communication link using a recycled optical code.

At step 218, the method 200 may exchange data between the mobile endpoint device and the networked device. In one embodiment, all the data exchanged may be encrypted using the encryption key obtained in the optical code.

At step 220, the method 200 may determine if the secure communication link is still valid. For example, when the user is finished with the secure communication link, the user may actively end the secure communication link via an "end" button on the user interface of the software application running on the mobile endpoint device. This may send a command over the secure communication link to the networked device to tear down the secure communication link. For example, the specified communication ports may be closed and no further communications from the mobile endpoint device may be accepted.

In another embodiment, an inactivity timer may be used. If no activity is detected within a predefined period of time (e.g., 1 minute, 0.5 hour, 1 hour, and the like), then the secure communication link may be automatically terminated.

In another embodiment, a session time may be used. For example, each optical code may have a predefined session time period (e.g., 30 minutes, 1 hour, 24 hours, and the like). As a result, after the predefined session time period has expired, the secure communication link may be automatically terminated.

If the secure communication link is still valid, the method 200 may proceed back to step 218 and continue to exchange data between the mobile endpoint device and the networked device. If the secure communication link is not valid, the method 200 may proceed to step 224. At step 224, the method 200 ends.

Figure 3:
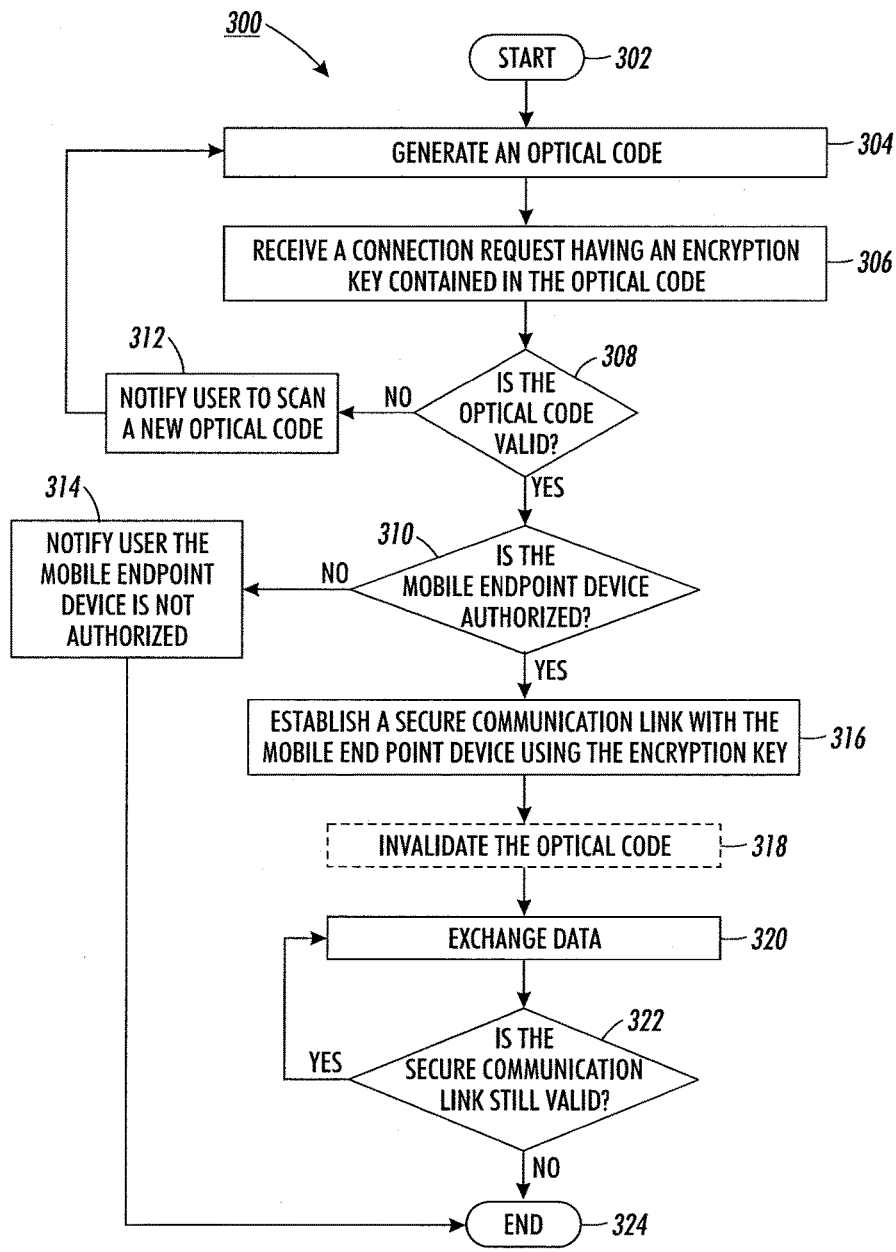
FIG. 3 illustrates an example flowchart of another embodiment of a method for establishing a secure communication link between a mobile endpoint device and a networked device.

FIG. 3 illustrates a flowchart of another embodiment of a method 300 for establishing a secure communication link between a mobile endpoint device and a networked device. In one embodiment, one or more steps or operations of method 300 may be performed by the networked device 106, the application server 112 and/or a general-purpose computer as illustrated in FIG. 4 and discussed below.

The method 300 begins at step 302. At step 304, the method 300 may generate an optical code. For example, the optical code may be displayed on a graphical user interface of the networked device or the networked device may print out the optical code. In one embodiment, the optical code may be a two dimensional bar code, such as for example, a quick response (QR) code or a bar code in accordance with another format.

In one embodiment, the optical code may contain all the wireless accessibility information the mobile endpoint device needs to request and establish a secure communication link with the networked device. For example, the optical code may include an encryption key, an address of the networked device, a communication protocol, a communication port, a wireless connection setting, and the like.

At step 306, the method 300 receives a connection request having an encryption key contained in the optical code. For example, a mobile endpoint device may have scanned the optical code generated at step 304 and sent a connection request to the networked device using the encryption key contained in the optical code.

At step 308, the method 300 may determine if the optical code is valid. For example, the networked device may check to ensure that the session ID sent with the encrypted connection request has not been previously used. If the optical code is not valid, the method 300 may proceed to step 312.

At step 312, the method 300 notifies the user to scan a new optical code. For example, the networked device may display a message on the graphical user interface or forward a push notification using the encryption key to the mobile endpoint device. The method 300 proceeds to step 304 where another optical code is generated.

Referring back to step 308, if the optical code is valid, the method 300 may proceed to step 310. At step 310, the method 300 determines if the mobile endpoint device is authorized. For example, the networked device may check if the mobile endpoint device is registered and authorized to establish a secure communication link with the networked device. In one embodiment, identification information (e.g., a device name, media access control (MAC) ID, an IP address, and the like) associated with the mobile endpoint device may be sent with the connection request. The identification information may be compared identification information contained in a list of authorized mobile endpoint devices or a list of authorized users having an associated mobile endpoint device to determine if the mobile endpoint device is authorized.

In one embodiment, the determination may be made by the networked device. In another embodiment, an AS in communication with the mobile endpoint device and the networked device may perform the determination to check if the mobile endpoint device is authorized.

If the mobile endpoint device is not authorized at step 310, the method 300 may proceed to step 314. At step 314, the networked device notifies the user that the mobile endpoint device is not authorized. The method 300 may then proceed to step 324 where the method 300 ends.

Referring back to step 310, if the mobile endpoint device is authorized, the method 300 may proceed to step 316. At step 316, the method 300 establishes a secure communication link with the mobile endpoint device using the encryption key.

At optional step 318, the method 300 may invalidate the optical code that was just used to establish the secure communication link. For example, the session ID may be marked as being used such that the same optical code is not generated or accepted in subsequent connection request after the current communication session is terminated. As a result, each secure communication link is unique and prevents another endpoint device from attempting to snoop on the secure communication link using a recycled optical code.

At step 320, the method 300 may exchange data between the mobile endpoint device and the networked device. In one embodiment, all the data exchanged may be encrypted using the encryption key obtained in the optical code.

At step 322, the method 300 may determine if the secure communication link is still valid. For example, when the user is finished with the secure communication link, the user may actively end the secure communication link via an "end" button on the user interface of the software application running on the mobile endpoint device. This may send a command over the secure communication link to the networked device to tear down the secure communication link. For example, the specified communication ports may be closed and no further communications from the mobile endpoint device may be accepted.

In another embodiment, an inactivity timer may be used. If no activity is detected within a predefined period of time (e.g., 1 minute, 0.5 hour, 1 hour and the like), then the secure communication link may be automatically terminated.

In another embodiment, a session time may be used. For example, each optical code may have a predefined session time period (e.g., 30 minutes, 1 hour, 24 hours, and the like).

As a result, after the predefined session time period has expired the secure communication link may be automatically terminated.

If the secure communication link is still valid, the method 300 may proceed back to step 320 and continue to exchange data between the mobile endpoint device and the networked device. If the secure communication link is not valid, the method 300 may proceed to step 324. At step 324, the method 300 ends.

It should be noted that although not explicitly specified, one or more steps, functions, or operations of the methods 200 and 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIGS. 2 and 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a processor element 402 (e.g., a CPU), a memory 404, e.g., random access memory (RAM) and/or read only memory (ROM), a module 405 for establishing a secure communication link between a mobile endpoint device and a networked device, and various input/output devices 406 (e.g., storage devices, including but not limited to, a tape drive, a floppy drive, a hard disk drive or a compact disk drive, a receiver, a transmitter, a speaker, a display, a speech synthesizer, an output device (such as a graphic display, printer, and the like), an output port, and a user input device (such as a keyboard, a keypad, a mouse, and the like)).

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps of the above disclosed methods. In one embodiment, the present module or process 405 for establishing a secure communication link between a mobile endpoint device and a networked device can be loaded into memory 404 and executed by processor 402 to implement the functions as discussed above. As such, the present method 405 for establishing a secure communication link between a mobile endpoint device and a networked device (including associated data structures) of the present disclosure can be stored on a non-transitory (e.g., physical and tangible) computer readable storage medium, e.g., RAM memory, magnetic or optical drive or diskette and the like. For example, the hardware processor 402 can be programmed or configured with instructions (e.g., computer readable instructions) to perform the steps, functions, or operations of methods 200 and 300.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A method for establishing a secure communication link between a mobile endpoint device and a networked device, comprising:

pre-registering, by a processor of the mobile endpoint device, the mobile endpoint device with a retailer of the networked device to establish an account to control the networked device, wherein the networked device comprises a printer in a public location at the retailer;

causing, by the processor of the mobile endpoint device, an image capturing device to capture an optical code that is printed out by the networked device, wherein the optical code comprises a unique one time code that contains configuration information and an encryption key;

forwarding, by the processor of the mobile endpoint device, the image of the optical code to a remotely located application server to decode the optical code;

receiving, by the processor of the mobile endpoint device, the configuration information that is decoded from the remotely located application server, wherein the configuration information comprises a session identification, an address of the networked device, a communication protocol, a communication port, and a wireless connection setting;

configuring, by the processor of the mobile endpoint device, the mobile endpoint device in accordance with the configuration information to establish the secure communication link with the networked device beginning with an initial communication using the encryption key;

sending, by the processor of the mobile endpoint device, the initial communication comprising a request to the networked device to establish the secure communication link to the networked device to remotely control the networked device to print documents via the mobile endpoint device, wherein the request is encrypted using the encryption key;

receiving, by the processor of the mobile endpoint device, a confirmation from the networked device that the secure communication link is established between the mobile endpoint device and the networked device once the networked device has authenticated the mobile endpoint device based upon the request and a determination that the mobile endpoint device is pre-registered with the retailer, wherein the confirmation is encrypted using the encryption key;

receiving, by the processor of the mobile endpoint device, an indication to end the secure communication link via an end button on a user interface of the mobile endpoint device;

sending, by the processor of the mobile endpoint device, a command to the networked device to tear down and end the secure communication link, wherein the session identification is marked as being used such that the session identification is changed in the configuration information contained in a subsequent optical code that is printed out by the networked device.

2. The method of claim 1, further comprising:
receiving, by the processor, a notification that the optical code is invalid.

3. The method of claim 1, further comprising:
ending, by the processor, the secure communication link upon expiration of a session timer.

4. The method of claim 1, wherein the optical code is also displayed on the networked device.

5. The method of claim 1, wherein the optical code comprises a two-dimensional bar code.

6. The method of claim 1, wherein a software application for establishing the secure communication link is downloaded and installed on the mobile endpoint device before scanning the optical code.

7. A non-transitory computer-readable medium storing a plurality of instructions, which when executed by a processor of a mobile endpoint device, cause the processor to perform operations for establishing a secure communication link between the mobile endpoint device and a networked device, the operations comprising:
 pre-registering the mobile endpoint device with a retailer of the networked device to establish an account to control the networked device, wherein the networked device comprises a printer in a public location at the retailer;
 causing an image capturing device to capture an optical code that is printed out by the networked device, wherein the optical code comprises a unique one time code that contains configuration information and an encryption key;
 forwarding the image of the optical code to a remotely located application server to decode the optical code;
 receiving the configuration information that is decoded from the remotely located application server, wherein the configuration information comprises a session identification, an address of the networked device, a communication protocol, a communication port, and a wireless connection setting;
 configuring the mobile endpoint device in accordance with the configuration information to establish the secure communication link with the networked device beginning with an initial communication using the encryption key;
 sending the initial communication comprising a request to the networked device to establish the secure communication link to the networked device to remotely control the networked device to print documents via the mobile endpoint device, wherein the request is encrypted using the encryption key;
 receiving a confirmation from the networked device that the secure communication link is established between the mobile endpoint device and the networked device once the networked device has authenticated the mobile endpoint device based upon the request and a determination that the mobile endpoint device is pre-registered with the retailer, wherein the confirmation is encrypted using the encryption key;
 receiving an indication to end the secure communication link via an end button on a user interface of the mobile endpoint device; and
 sending a command to the networked device to tear down and end the secure communication link, wherein the session identification is marked as being used such that the session identification is changed in the configuration information contained in a subsequent optical code that is printed out by the networked device.

8. The non-transitory computer-readable medium of claim 7, further comprising:
 receiving a notification that the optical code is invalid.

9. The non-transitory computer-readable medium of claim 7, further comprising:
 ending the secure communication link upon expiration of a session timer.

10. The non-transitory computer-readable medium of claim 7, wherein the optical code is also displayed on the networked device.

11. The non-transitory computer-readable medium of claim 7, wherein the optical code comprises a two-dimensional bar code.

12. The non-transitory computer-readable medium of claim 7, wherein a software application for establishing the secure communication link is downloaded and installed on the mobile endpoint device before scanning the optical code.

13. A method for establishing a secure communication link between a mobile endpoint device and a networked device, comprising:
 pre-registering, by a processor of the mobile endpoint device, the mobile endpoint device with a retailer of the networked device to establish an account to control the networked device, wherein the networked device comprises a printer in a public location at the retailer;
 causing, by the processor of the mobile endpoint device, an image capturing device to capture a quick response code that is printed out by the networked device via an optical reader of the mobile endpoint device, wherein the quick response code comprises a unique one time code that contains wireless accessibility information and an encryption key;
 forwarding, by the processor of the mobile endpoint device, the image of the quick response code to a remotely located application server to decode the quick response code;
 receiving, by the processor of the mobile endpoint device, the configuration information that is decoded from the remotely located application server, wherein the configuration information comprises a session identification, an address of the networked device, a communication protocol, a communication port, and a wireless connection setting;
 configuring, by the processor of the mobile endpoint device, the mobile endpoint device in accordance with the wireless accessibility information, wherein the configuring comprises selecting a communication port based upon the wireless accessibility information and selecting a communication protocol based upon the wireless accessibility information to establish the secure communication link with the networked device beginning with an initial communication that is secure using the encryption key;
 sending, by the processor of the mobile endpoint device, the initial communication that is secure comprising a request to the networked device to establish the secure communication link to the networked device to remotely control the networked device to print documents via the mobile endpoint device, wherein the request is encrypted using the encryption key;
 receiving, by the processor of the mobile endpoint device, a confirmation from the networked device that the secure communication link is established between the mobile endpoint device and the networked device once the networked device has authenticated the mobile endpoint device based upon the request and a determination that the mobile endpoint device is pre-registered with the retailer, wherein the confirmation is encrypted using the encryption key;
 receiving, by the processor of the mobile endpoint device, an indication to end the secure communication link via an end button on a user interface of the mobile endpoint device; and sending, by the processor of the mobile endpoint device, a command to the networked device to tear down and end the secure communication link, wherein the session identification is marked as being used such that the session identification is changed in the configuration information contained in a subsequent optical code that is printed out by the networked device.

14. The method of claim 13, further comprising:
receiving, by the processor, a notification that the quick response code is invalid.

* * * * *